No. 770,463. Patented September 20, 1904.

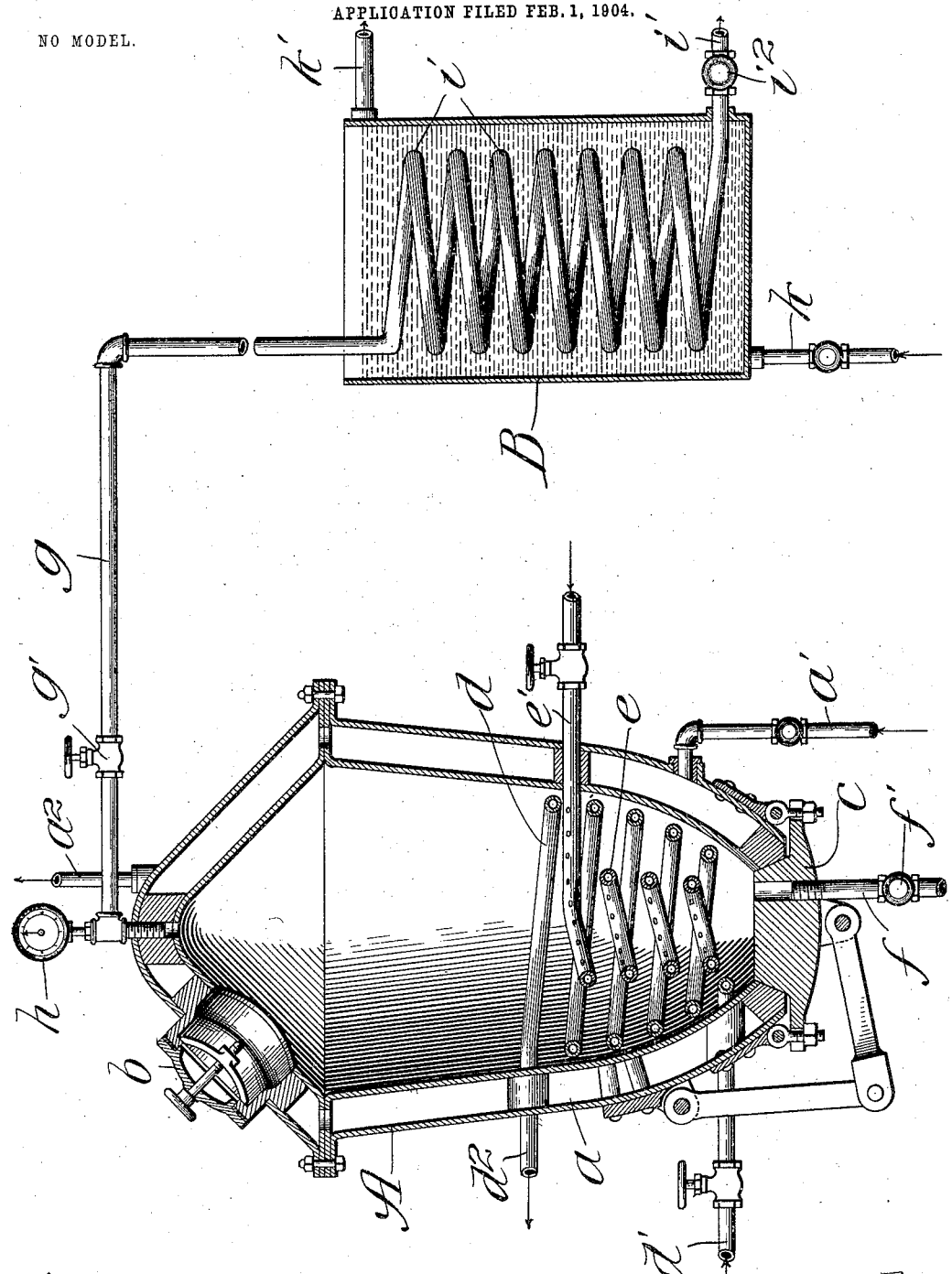

UNITED STATES PATENT OFFICE.

WILLIAM HOSKINS, OF LAGRANGE, ILLINOIS.

METHOD OF TREATING WOOD FOR THE PRODUCTION OF PAPER-PULP, TURPENTINE, &c.

SPECIFICATION forming part of Letters Patent No. 770,463, dated September 20, 1904.

Application filed February 1, 1904. Serial No. 191,508. (No specimens.)

*To all whom it may concern:*

Be it known that I, WILLIAM HOSKINS, a citizen of the United States, residing at Lagrange, in the county of Cook and State of Illinois, have invented a new and useful Improvement in Methods of Treating Wood for the Production of Paper-Pulp, Turpentine, &c., of which the following is a specification.

My invention relates to an improved method of obtaining from wood in an economical manner valuable products, constituent parts of the wood, by a procedure that will render such products desirable and merchantable.

Although my invention in its broader sense is not to be limited to the treatment of any particular species of wood, it is more especially adapted for separating and saving the valuable constituent parts of fatty wood—such, for example, as the more resinous varieties of pine.

In various localities in the United States, more especially in the Southern States bordering on the Atlantic Ocean and Gulf of Mexico, there are immense tracts of forest land covered with trees and wood, generally known as "Southern pine," "long-leaf pine," "yellow pine," "Georgia pine," &c. In many localities the trees suitable for lumber have been taken from these lands; but there remain large numbers of dead and dying trees, besides logs and stumps, and in many cases these consist of the so-called "heart-wood" only, the bark and sap-wood having decayed. All such remaining trees and woods have been heretofore considered practically worthless. They are rich in turpenes and resinous constituents, and while efforts have been made to work them for these products alone, usually by submitting the wood to destructive distillation, the industry has not met with such a degree of commercial success as to warrant its being carried on, so far as I am aware, except in a few particularly favorable localities. I have discovered that by subjecting this wood in an approved manner to heat at a degree below that which would injure the fiber for the production of paper-pulp or cause destructive distillation (in the sense of chemical disintegration) of the constituents the volatile condensable constituents may be readily extracted and saved, the resinous constituents may be withdrawn in a manner to render them valuable, and the resultant fibrous portion is in a condition whereby it may be readily converted by further chemical treatment into paper-pulp of an exceptionally desirable and valuable quality.

To render my discovery most valuable from a commercial standpoint, the extraction and collection of the condensable volatiles, the withdrawing of the resinous constituents, and the treatment of the fibrous portion to produce paper-pulp should all be accomplished by steps of a continuous process. The after separation from each other of the collected or condensed turpenes and the like and of the resinous constituents may be accomplished by subsequent means, known or otherwise.

My primary object may be briefly stated to be that of providing a new and improved method of producing paper-pulp, more especially from fatty woods, and separating and saving the turpenes or turpentine and other volatile condensable constituents of the wood. The method also includes the removal of any resinous constituents in a manner to permit them to be readily separated subsequently, if desired.

Suitable combinations of various well-understood apparatus may be employed for carrying out the steps of my process, and various chemicals may be utilized to cause proper disintegration of the fibrous constituent of the wood into pulp suitable for the manufacture of paper, and in the present connection I describe generally the apparatus and course of procedure which I now consider best adapted for accomplishing the most desirable results in the most economical manner.

The accompanying drawing is a broken sectional view of apparatus of a form suitable for use in the practice of my invention.

A digester A, capable of holding a pressure of preferably not less than ten atmospheres, is nearly filled with the wood to be treated. The digester which I prefer to employ, as shown, has a steam-jacket $a$, provided with an inlet-pipe $a'$ and outlet-pipe $a^2$, a steam-tight charging-door $b$ near its upper end, and a steam-tight discharging or clean-out door $c$ at its lower end. In the digester-chamber is an outer steam-coil $d$, having a valved inlet-pipe $d'$ and outlet-pipe $d^2$, and an inner perforated steam-coil $e$, having a valved inlet-pipe $e'$. Extending through the cover $c$ at the lower end of the digester is an outlet-pipe $f$, provided with a valve $f'$, and extending from the top of the digester is an outlet-pipe $g$, provided with a valve $g'$. Interposed in the pipe $g$ is a pressure-gage $h$. The pipe $g$ leads to the upper end of the coil $i$ of a condenser B. In the outlet-pipe $i'$ of the coil $i$ is a valve $i^2$, and the condenser is provided with a valved cold-water-inlet pipe $k$ and a water-outlet pipe $k'$. The wood charged into the digester is preferably in the form of chips or similar pieces, though the process will work in a manner more slowly by providing the wood in large pieces. The pipes $d'$ $e'$ extend from a steam-supplier. The valve of the pipe $e'$ is opened for the first step of the method to cause steam to enter the digester and mingle with the turpentine and other volatile constituents of the wood, which will pass out with the steam through the pipe $g$ to the condenser B and may be withdrawn through the pipe $i'$ and saved. Resinous material which the wood contains is melted out to a large extent by this treatment and in large part settles to the bottom of the digester, whence it may be withdrawn through the pipe $f$ by opening the valve $f'$. After all possible resinous matter has been drawn off in this way and no further volatile materials, constituent parts of the wood, are expelled through the pipe $g$ the inlet-valve at the pipe $e'$ is closed. The door $b$ is then removed and the digester charged with sufficient solution of caustic soda or other suitable alkali, whereby the liquor contained in the digester shall have a gravity of, say, 1.200. The outlet-valve $g'$ is then closed, and the valves of the pipes $d'$ $a'$ are opened to let steam into the coil $d$ and steam-jacket to raise the temperature of the digester to the point where steam is generated, whereby the pressure in the digester is raised to about five or six atmospheres. This pressure is maintained in the digester for from six to twelve hours, depending upon the quantity and quality of wood being treated, and by this means the wood is reduced to a pulp. This wood-pulp which has been freed from resinous material by the combination thereof with some of the alkali may be blown out through the pipe $f$ by the steam-pressure and saved.

It will be understood that the heat employed in any part of this process is below that which would injuriously affect the fiber and sufficient only to cause the separation of existing volatiles, such as turpentine, from the admixture thereof with resinous compounds. I carefully avoid the employment of heat in the digester, which would cause the destructive distillation or breaking down of the resinous or other constituents of the wood, with the consequent formation of resin-oils, acetic acid, alcohol, and other compounds which are not existant as such in the wood employed, because not only would such heat injure the fiber for paper-pulp, but it would cause such contamination of the volatiles desired as would materially impair their commercial value.

The alkali may be recovered from the liquor in the usual way, or it may be concentrated and finally heated in closed retorts, whereby by destructive distillation of the resinous and other organic alkali compounds tar, resin-oils, &c., may be recovered, as well as the alkali. The alkali may be leached out, or the mixture of tar, resin-oils, &c., with alkali may be available after concentration for use in the manufacture of soap, the excessive alkali present being utilized for the saponification of fats or oils, while the resin-soap becomes a part of the soap product.

The pulp produced from fatty woods, and particularly from the highly-resinous Southern or Georgia pine, as before stated, makes a most desirable and valuable paper-stock, superior in several particulars to wood-pulp manufactured from less fatty woods. The turpentine is also of a high grade, and these two products alone would render the practice of my improved method upon the fatty Southern pines very profitable.

My invention has nothing to do with the after treatment or separation of the tar, resin-oils, &c.; but they may be counted as valuable by-products.

It may be understood that while I prefer to practice my invention as described and with apparatus of the character shown various modifications may be made without departing from the spirit of my invention as set forth in the claims.

What I claim as new, and desire to secure by Letters Patent, is—

1. The method of producing paper-pulp from wood and extracting and saving volatile condensable constituents of the wood, which consists first in subjecting the wood to the action of heat at a degree sufficient to melt any resinous constituents, but maintained below that which would impair the fiber for the production of paper-pulp, carrying off, collecting and saving any volatilized condensable constituents, and second chemically treating the residual fibrous constituent of the wood to reduce the same to a paper-pulp.

2. The method of producing paper-pulp from wood and extracting and saving volatile condensable constituents of the wood, which consists in subjecting the wood to the action of heat at a degree sufficient to melt any resinous constituents, but maintained below that which would impair the fiber for the production of paper-pulp, carrying off, collecting and saving any volatilized condensable constituents, withdrawing the melted resinous constituents of the wood, and chemically treating the residual fibrous constituent of the wood to reduce the same to a paper-pulp.

3. The method of producing paper-pulp from fatty woods, and separating and saving volatile condensable constituents of the wood, which consists in subjecting the wood in a digester to the action of steam at a temperature below that which would cause destructive distillation of the resinous constituents, to separate therefrom the volatilizable condensable constituents, carrying off, condensing and saving the said constituents, and subjecting the residual fibrous constituent of the wood, in said digester, to the action of a solution of caustic soda, or other chemical, to reduce the wood to pulp, then withdrawing and saving the pulp.

4. The method of producing paper-pulp from fatty woods, and separating and saving volatile condensable constituents of the wood, which consists in subjecting the wood in a digester to the action of steam at a temperature below that which would cause destructive distillation of the resins, to separate therefrom the volatilizable condensable constituents and melt out resinous constituents, carrying off, condensing and saving any volatilized constituents, and withdrawing resinous constituents of the wood, and subjecting the residual fibrous constituent of the wood, in said digester, to the action of a solution of caustic soda, or other chemical, to reduce the wood to pulp, then withdrawing and saving the pulp.

5. The method of producing paper-pulp from fatty woods, and separating and saving volatile condensable and resinous constituents of the wood, which consists in subjecting the wood in a digester to the action of steam at a temperature below that which would cause destructive distillation of the resins, to separate therefrom the volatilizable condensable constituents and melt out resinous constituents, carrying off, condensing and saving any volatilized constituents and withdrawing resinous constituents of the wood, subjecting the residual fibrous constituent of the wood, in said digester, to the action of caustic soda or other chemical, to reduce the wood to pulp, then withdrawing and saving the pulp, thereafter concentrating the liquors, submitting said concentrates to destructive distillation, to produce therefrom tarry and oily products, and finally leaching the residuum to recover the chemicals, substantially as and for the purpose set forth.

WILLIAM HOSKINS.

In presence of—
WALTER N. WINBERG,
H. C. MILLER.